(12) United States Patent
Sheikh Naziruddin et al.

(10) Patent No.: US 9,247,075 B2
(45) Date of Patent: Jan. 26, 2016

(54) DATA SHARING WITH MOBILE DEVICES

(71) Applicant: International Business Machines Corporation, Armonk, NY (US)

(72) Inventors: Sheikh Talib Sheikh Naziruddin, Cheras (MY); Thierry P. R. Supplisson, Cork (IE); Wee Siang Yeap, Kota Damansara (MY); Eng Seng Yeo, Kuala Lumpur (MY)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 14/010,731

(22) Filed: Aug. 27, 2013

(65) Prior Publication Data

US 2015/0065084 A1   Mar. 5, 2015

(51) Int. Cl.
  *H04W 88/10* (2009.01)
  *H04W 92/18* (2009.01)
  *H04M 15/00* (2006.01)
  *H04W 4/24* (2009.01)
  *H04W 4/26* (2009.01)

(52) U.S. Cl.
  CPC ........ *H04M 15/7652* (2013.01); *H04M 15/765* (2013.01); *H04W 4/24* (2013.01); *H04W 88/10* (2013.01); *H04W 4/26* (2013.01)

(58) Field of Classification Search
  CPC .............................................. H04W 15/7652
  See application file for complete search history.

(56) References Cited

U.S. PATENT DOCUMENTS

| | | | |
|---|---|---|---|
| 8,112,062 B2 | 2/2012 | Pattabiraman | |
| 8,285,250 B2 | 10/2012 | Rubin et al. | |
| 2012/0054661 A1 | 3/2012 | Rados et al. | |
| 2012/0064893 A1* | 3/2012 | Reagor | 455/436 |
| 2012/0149328 A1 | 6/2012 | Chakraborty et al. | |
| 2012/0278466 A1 | 11/2012 | Jallapelli et al. | |
| 2013/0022030 A1* | 1/2013 | Hillier | 370/338 |
| 2013/0080522 A1 | 3/2013 | Ren | |
| 2013/0196626 A1 | 8/2013 | Zalmanovitch et al. | |
| 2014/0179266 A1* | 6/2014 | Schultz et al. | 455/406 |
| 2014/0359405 A1* | 12/2014 | Hou | 715/202 |
| 2015/0011179 A1* | 1/2015 | Won | 455/405 |

OTHER PUBLICATIONS

Sheikh Naziruddin et al., "Data Sharing With Mobile Devices," U.S. Appl. No. 14/465,895, filed Aug. 22, 2014.

(Continued)

*Primary Examiner* — Lester Kincaid
*Assistant Examiner* — Daniel G Bassett
(74) *Attorney, Agent, or Firm* — Penny L. Lowry; Joseph Petrokaitis (57) ABSTRACT

Cellular data access capabilities can be shared between mobile devices. Users of the mobile devices can be presented with options for selecting a set of polices for sharing cellular data access capabilities between the mobile devices and as a function of cellular data plan capacities. The set of policies can be stored in a memory of the mobile devices. Using a first application operating on a first one of the mobile devices and based upon the stored set of polices, a request can be transmitted to request cellular data access capabilities of a second one of the mobile devices. Using a second application operating on the second mobile device and based upon the stored set of polices, the first mobile device can be provided access to cellular data access capabilities of a second mobile devices.

17 Claims, 6 Drawing Sheets

(56) References Cited

OTHER PUBLICATIONS

Cisco, "Multi-Device Plans: Offer Shared Mobile Data Allowances for Multiple Devices", FLGD 09634 Apr. 2011. pp. 1-3. © 2011 Cisco and/or its affiliates. Printed in USA.

Mace, M., "The Truth About the Wireless Bandwidth "Crisis"," Mobile Opportunity, Jun. 2011. http://mobileopportunity.blogspot.com/2011/06/truth-about-wireless-bandwidth-crisis.html.

Pediaditakis, D., "Verifying Home Network Bandwidth Sharing Plans", 7th International Conference on Network and Service Management (CNSM), Oct. 24-28, 2011. IEEE. http://ieeexplore.ieee.org/stamp/stamp.jsp?tp=&arnumber=6103969.

Wynne, E., "Data Overload-Mobile Networks Collapsing Under the Pressure of Our Smart Phone Obsession," Jul. 31, 2012. http://www.abc.net.au/local/stories/2012/07/31/3557647.htm © 2013 ABC.

* cited by examiner

DATA SHARING WITH MOBILE DEVICES

FIELD

This disclosure relates to sharing data communication capabilities between mobile devices. In particular, it relates to sharing data transfer capabilities between cellular-capable devices.

BACKGROUND

Mobile communication devices can allow individuals to access data and services while providing the convenience of being easily portable to different locations. Certain types of mobile communication devices are cellular-capable, such as cellular (smart) phones or handheld tablets. These devices allow data transfers over the cellular telephone network, and thereby provide data access across the substantial coverage areas for the cellular telephone network.

Cellular service providers offer a variety of cellular phone plans to their customers. The terms of these plans vary and can include, for example, limitations on the amount of cellular data usage and cost per amount of data usage.

SUMMARY

Embodiments of the present disclosure are directed toward sharing cellular data capacity between a plurality of mobile devices using a distributed and scalable solution. The mobile devices can be configured and arranged with software applications that allow the devices to share cellular data access capabilities according to a set of policies and rules. For instance, a first mobile device (e.g., a smart phone or a tablet) can request access to a cellular communication circuit of another, second, mobile device. Based upon the set of policies, the first mobile device can accept or deny the request. When the request is accepted, the first mobile can use a cellular communication circuit to retrieve data that has been requested by the second mobile device. Once the data is retrieved, the first mobile device can provide the data using a communication path that is not subject to (plan-based) limitations on cellular communications. In this manner, users of mobile devices can take advantage of available data download capacity of other users. In some instances, this sharing can be accomplished substantially independently from a centralized control point, such as a cellular service provider.

Embodiments of the present disclosure are directed toward a distributed method for sharing cellular data access capabilities between mobile devices. The method can include providing, to users of the mobile devices, interfaces that present options for selecting a set of policies for sharing cellular data access capabilities between the mobile devices and as a function of cellular data plan capacities. The set of policies can be stored in a memory of the mobile devices. Using a first application operating on a first one of the mobile devices and based upon the stored set of polices, a request can be transmitted to request cellular data access capabilities of a second one of the mobile devices. Using a second application operating on the second mobile device and based upon the stored set of polices, the first mobile device can be provided access to cellular data access capabilities of the second mobile device.

Certain embodiments are directed toward a sharing mobile device that contains a cellular communication circuit. The cellular communication circuit can be configured and arranged to communicate data over a cellular data network. A memory circuit stores profiles for one or more mobile devices, which can also have cellular communication capabilities. A processing circuit is configured and arranged to receive a cellular data sharing request from another mobile device. The processing circuit can then access cellular data usage information in the profiles that corresponds to the other mobile device and determine a data sharing response as a function of the received sharing request and the accessed cellular data usage information. From the determination, the mobile device can provide the other mobile device with access to the cellular communication circuit.

Various embodiments are directed toward a requesting mobile device that has a cellular communication circuit that is configured and arranged to communicate data over a cellular data network. A memory circuit can store profiles for one or more mobile devices. A processing circuit can be configured and arranged to monitor the amount of data transmitted over the cellular communication circuit. The processing circuit can also detect when the amount of transmitted data exceeds a threshold amount and, in response thereto, access the stored profiles. A data sharing request can then be transmitted to a second mobile device, which was indicated by the stored profiles. Using the second mobile device, data can be accessed through the cellular data network.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the invention and do not limit the disclosure.

DETAILED DESCRIPTION

Aspects of the present disclosure relate to data sharing between mobile devices, more particular aspects relate to distributed data sharing between mobile devices that can have different data plans and providers. While the present disclosure is not necessarily limited to such applications, various aspects of the disclosure may be appreciated through a discussion of various examples using this context.

Embodiments of the present disclosure are directed toward a plurality of mobile devices that are configured and arranged to share cellular data access capabilities according to a set of policies and rules. For instance, first mobile device (e.g., a smart phone or a tablet) can request access to a cellular communication circuit of another, second, mobile device. Based upon the set of policies, the first mobile device can accept or deny the request. When the request is accepted, the first mobile device can use a cellular communication circuit (e.g., the second mobile device can use the first mobile device as a proxy by redirecting data packets) to retrieve data that has been requested by the second mobile device. Once the data is retrieved, the first mobile device can provide the data using a communication path that is not subject to (plan-based) limitations on cellular communications, such as over a local wireless connection. In this manner, users of mobile devices can take advantage of available cellular data download capacity of other users.

The available download capacity can be determined by an individual's contract with their cellular service provider. Cellular service providers can offer data plans that place plan-based limitations on the amount of data that an individual can use during a plan period (e.g., monthly). In certain instances, the limitations can be hard limits, where the individual is prohibited from data usages above the limit. In other instances, they can be soft limits, where the individual can continue to use data beyond the limit but is subject to one or more additional considerations. For instance, a cellular service provider may charge a certain rate (dollar amount per data unit) once a plan capacity or limit has been exceeded (e.g., $10 per MB). The cellular service provider can also use graduated rates, use bandwidth throttling or limit access to particular types of services or data (e.g., video downloads, website(s)). Various combinations of these and other limitations are also possible.

Consistent with various embodiments, the policies and rules can be controlled by individuals using the mobile devices and agreeing to mutual sharing arrangement(s). For instance, individuals can select which other devices are allowed to access their cellular communication circuit. The rules can also place limits on how much data can be shared. These limits can be more specifically tailored to limit amounts by any individual device, general limits across multiple (or all) allowed devices and combinations thereof. The rules can be based upon how much data has already been used and/or how much data remains within the particular plan. Various embodiments can also determine whether to grant access based upon a prediction of how much data an individual will use before the data plan capacity or limit resets (e.g., how much data will be used before the end of a monthly billing/plan period).

Certain embodiments contemplate the use of policies that can be configured to control, limit or adjust how access is allowed to a cellular communication circuit as a function of the type of data being requested. For instance, video downloads can be particularly data intensive while having a relatively low priority (e.g., mostly for entertainment value) or a navigation-based application be given a relatively high priority when compared to a social networking application. Accordingly, the profile data can indicate that access to certain content (e.g., videos) can be limited in various manners. In certain instances, this type of limitation can prohibit any of a particular type of content from being downloaded. Other possibilities include, but are not limited to, limiting an amount of bandwidth provided and limiting the type of content accessed (e.g., lowering the resolution of the video). In certain embodiments, access for website browsing may be allowed while access for email downloads is limited (or vice versa). Moreover, different levels of limitations can be applied for a variety of different types of data requests. For instance, Voice over Internet Protocol connections could be allowed, while video is limited to a particular bandwidth and email related downloads are prohibited.

Particular aspects of the present disclosure are directed toward user interface(s) that facilitate the creation and configuration of data sharing rules and profiles. This allows individuals to configure their cellular capable device to allow sharing with others, such as with their family or friends, in a manner that all parties find acceptable. In certain embodiments a software application operating on their cellular device can generate the interface.

Figure 1:
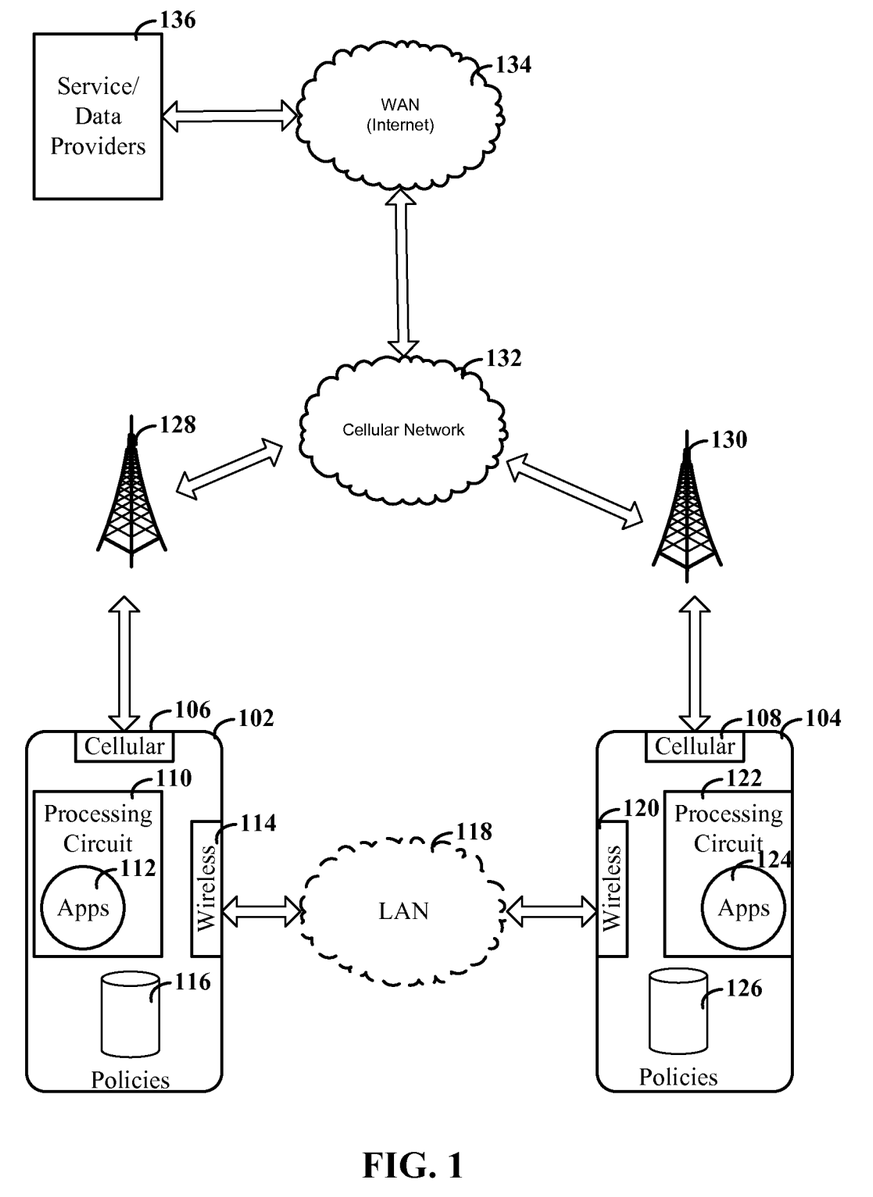
FIG. 1 depicts a system diagram for sharing access to cellular interface circuits, consistent with embodiments of the present disclosure.

Turning now to the figures, FIG. 1 depicts a system diagram for allowing shared access to cellular interface circuits, consistent with embodiments of the present disclosure. Cellular devices 102 and 104 (e.g., smart phones or tablets) include respective cellular interfaces 106 and 108. The cellular interfaces 106 and 108 allow the cellular devices 102 and 104 to access data using cellular network 132. For example, the cellular devices can interface with a local cellular tower 128 or 130. The cellular devices can then retrieve data using a cellular data connection that has been established in the manner. The particular type protocol used for the cellular data connection is not limiting, but can include cellular data connections using code division multiple access (CDMA), time division multiple access (TDMA), orthogonal frequency division multiplexing (OFDM) or other communication protocols.

In certain embodiments, the cellular devices 102 and 104 may request data that is made available over a wide area network (WAN) 134, such as the global Internet. For instance, service/data providers 136 can provide services such as websites, email or streaming audio or video content. A cellular device 102, 104 may send and receive data from such service providers 136.

The operator of the cellular network 132 can place limitations on how much data a particular device, or set of devices, can use. These limitations can take a variety of different forms including, but not necessary limited to, a set amount of data per plan/billing period for which there is no additional cost, data bandwidth throttling after a certain amount of data usage and/or graduated cost per unit of data (e.g., an increasing cost per kilobyte of information). Thus, cellular service providers can offer data plans to individuals where the individual has a set amount of available data. In this plan, the individual pays the same amount so long as the total amount of used data remains below their plan limit. Aspects of the present disclosure recognize that multiple individuals can benefit by sharing unused plan data in order to reduce plan overages of any one individual. A similar sharing incentive exists due to rate/bandwidth limiting and graduated data usage costs.

Certain aspects of the present disclosure recognize that distributed solutions for managing and carrying out the sharing of available plan data can mitigate problems stemming from a centralized control point, such as a cellular service provider. For instance, a system can be designed to use the processing power and storage capabilities of cellular devices (such as smart phones or tablets) to manage data sharing between cellular devices. This type of distributed solution can be particularly useful for ease of implementation and scalability. Moreover, a distributed solution can facilitate sharing between individuals substantially independent of their contract with a particular cellular service provider, including sharing between individuals using (subscribed to) different cellular service providers. Other aspects of a distributed solution can facilitate individualized customizations, such as allowing individuals to setup local profiles and rule sets.

Cellular devices 102 and 104 can each communicate directly with one another using (local0 wireless interface circuits 114 and 120. Wireless interface circuits 114 and 120 can use, but are not necessarily limited to, near field communications (NFC), WiFi/IEEE 802.11, Bluetooth/IEEE 802.15, or infrared. Accordingly, certain embodiments are directed toward the use of either a point-to-point connection or a connection through a local area network (LAN) 118.

Processing circuits 110 and 122 can be configured to execute one or more software modules or applications (apps) 112 and 124. The processing circuits 110 and 122 can include one or more computer processors, logic circuitry, discrete circuit components and combinations thereof. The software applications 112 and 124 can be configured to, in combination with the processing circuits 110 and 122, establish and enforce sharing policies between cellular devices 102 and 104. For instance, the software applications 112 and 124 can provide a user interface that provides an individual with options that include selecting which cellular devices to potentially allow data sharing. The options can also allow for the selection and creation of rules for when and how to share data with the cellular devices. The resulting polices or profiles can be stored in memory circuits as part of databases 116 and 126.

Consistent with certain embodiments, software application 124 may detect that the amount of available cellular plan data remaining is insufficient (e.g., there is no more plan data or the remaining plan data is below a threshold amount). In response, the software application 124 can access profile database 126 to find or identify one or more potential cellular data sharing partners, such as cellular device 102. The software application 124 can also search for available sharing partners by detecting their presence and availability using wireless interface 120. If the software application 124 finds multiple potential sharing partners, it can select a particular sharing partner to send a sharing request, select a subset of all potential sharing partners or send sharing requests to all potential sharing partners. The selection can be made based upon criteria stored in profile database 126 as well as upon other data, such as the type of data that will be shared, the type of connection available through wireless interface 120 and/or the previous sharing history between the various cellular devices.

Once a sharing request has been accepted, the software application can redirect subsequent data packets to the accepting cellular device, which can function as a proxy for subsequent communications.

Figure 2:
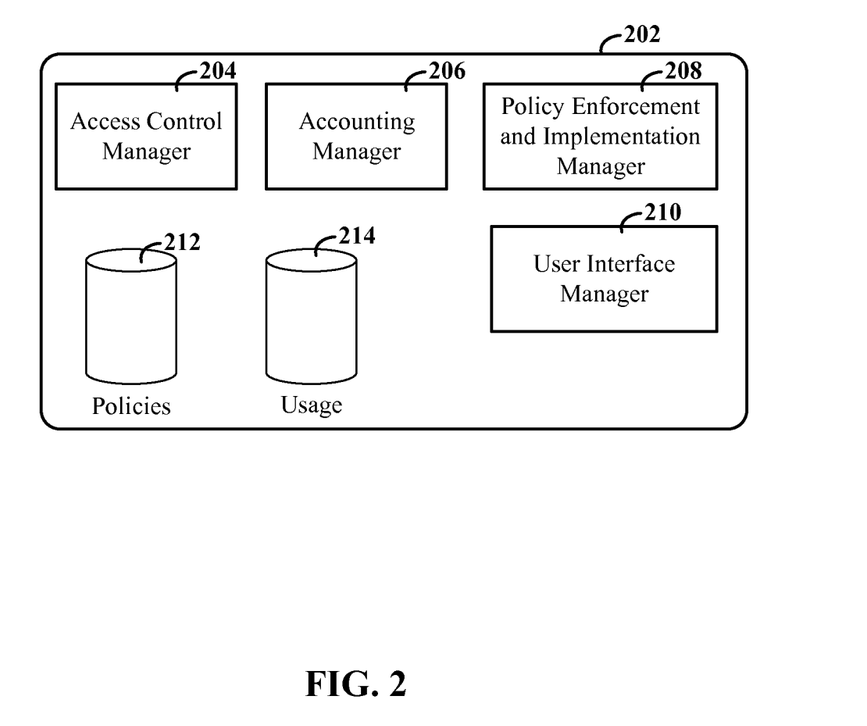
FIG. 2 depicts a block diagram of modules, memory and data bases, consistent with embodiments of the present disclosure.

FIG. 2 depicts a block diagram of modules and data bases for sharing cellular plan data, consistent with embodiments of the present disclosure. Cellular capable device 202 can serve as either a sharing mobile device or a requesting mobile device. These functions can each be facilitated by configuring the cellular device 202 to include one or more modules. In certain embodiments, these modules can facilitate sharing cellular data capabilities between devices in a distributed manner. One such module can be the user interface manager 210, which can be used to generate and display a user interface. This user interface can provide options for a user to select which other cellular devices to share with and to set and adjust the rules for sharing with the various selected cellular devices. The rules can then be stored in memory device to create a policy database 212.

Accounting manager 206 can be configured to monitor data usage of the cellular device 202 and/or to track remaining amount of plan data. Accounting manager 206 can also be configured to track data usage of other devices that share the cellular interface of cellular device 202. Accounting manager 206 can also track usage trends by monitoring and recording information that may be useful for predicting future usage, such as recording time of day, day of week or location based information. For instance, accounting manager 206 can place time stamps that correspond to data usage per day, hour or another time increment.

Access control manager 204 can be configured and arranged to handle the generation and receipt of access requests for shared cellular plan data. For instance, the access control manager 204 can detect the receipt of a sharing request by monitoring data received over a wireless interface other than the cellular interface. The access control manager 204 can be configured to send a data sharing request to policy enforcement and implementation manager 208. Policy enforcement and implementation manager 208 can be configured to access profile information and usage information from databases 212 and 214. For instance, the policy enforcement and implementation manager 208 can access policy information and usage information based upon the identity of the requesting device, which can be determined from data stored in the received sharing request. The policy and usage information can then be used to determine whether or not to accept the request or deny the request.

Consistent with various embodiments, the policy information can take any number of different forms. For instance, the policy information can specify a fairness component that limits that amount of data access provided to any one particular device so as to allow other devices to also share in any available plan data. The policy information could specify that data can be shared up until a threshold amount of data has been used by the sharing device. The threshold amount can be based upon a predictive usage for the device as applied to the remaining relevant billing period (after which the amount of available data can be reset).

In certain instances, the access control manager 204 can determine whether or not the cellular device 202 should seek access to a cellular interface of another device. For example, policy enforcement and implementation manager 208 can be configured to determine the current usage level for the cellular data plan (which can be stored in a usage database 214) and to compare the current usage level to a sharing threshold level. This determination can be made in response to detecting a data access request being generated by a software application, where the data access request can be fulfilled using a cellular data connection. For instance, the access control manager 204 can detect TCP/IP packets associated with a software application, such as a web browser, an email client or a streaming application. The access control manager 204 can then communicate with the policy enforcement and implementation manager 208, which can access usage and policy databases 214 and 212 to determine whether or not the detected access should trigger the generation of a data sharing request. This result of this determination can then be provided to the access control manager 204.

Access control manager 204 can transmit a data sharing request to one or more devices with (potential) cellular plan data available for sharing. In certain embodiments, access control manager 204 can identify a plurality of potential devices for potential sharing of plan data. Certain aspects of the present disclosure are directed toward transmitting a data sharing request to multiple devices and then selecting between those devices which grant the data sharing request. For instance, the data sharing request can be transmitted using multicast or broadcast mechanisms, such as having all devices with mutually agreed sharing policies be configured to respond to a particular transmission address or a more generalized broadcast message protocol can be used (e.g., a multicast Internet Protocol (IP) address).

Access control manager 204 can select a destination device for a sharing request based upon a number of different parameters including, but not necessarily limited to, the amount of plan data available for sharing or the data bandwidth capabilities or limitations or the devices. In various embodiments, access control manager 204 can select a subset of the potential devices (the subset can be a single device or multiple devices) and send a sharing request to the subset, e.g., as opposed to broadcasting to all potential devices. This selection can also be made according to a variety of different parameters and considerations.

Figure 3:
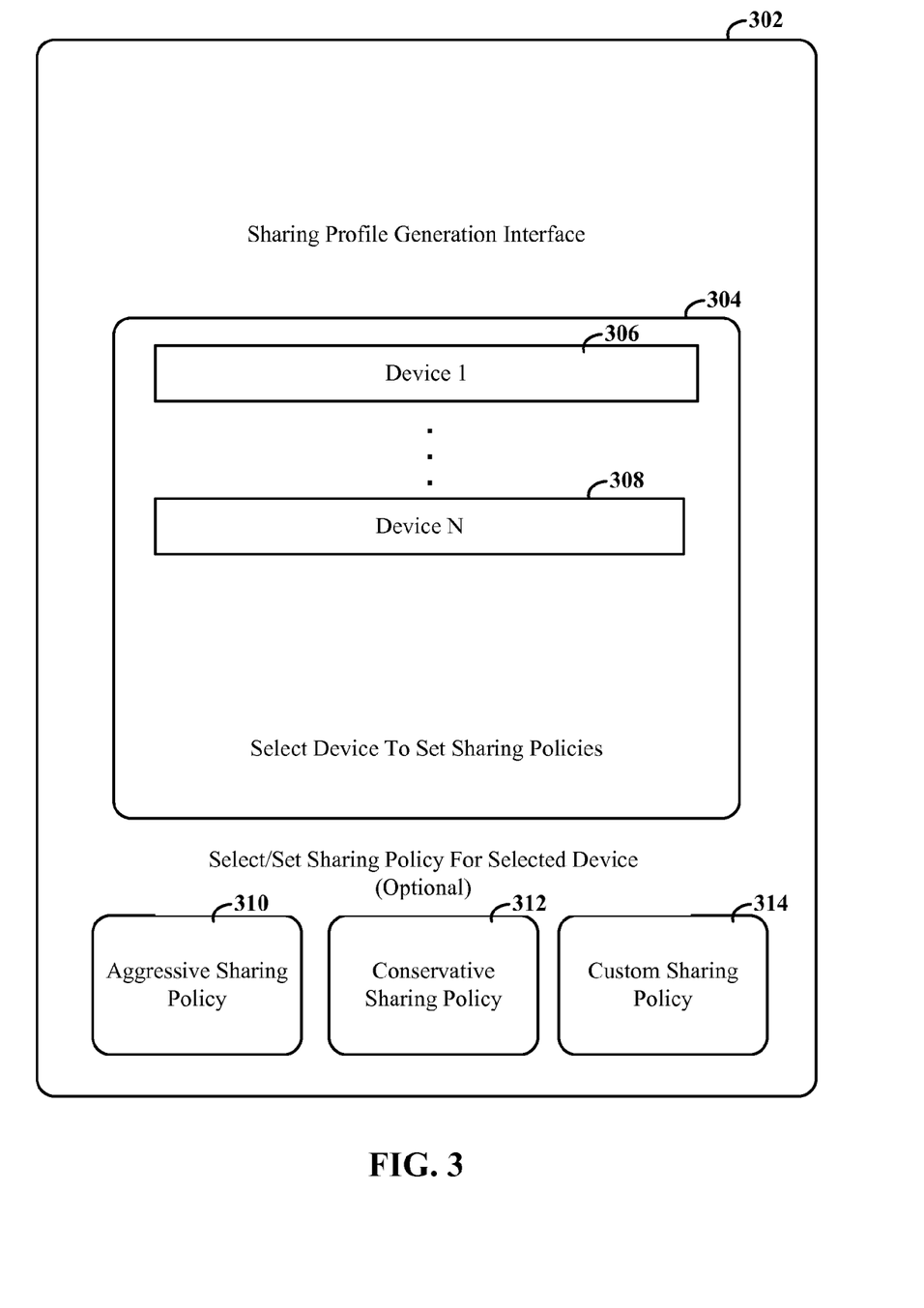
FIG. 3 depicts an interface for configuring sharing profiles and rules, consistent with embodiments of the present disclosure.

FIG. 3 depicts an interface for configuring sharing profiles and rules, consistent with embodiments of the present disclosure. Display 302 can present options that allow an individual to configure their sharing preferences. For instance, a list 304 can display potential devices 306-308. An individual can select one or more of these devices 306-308 in order to indicate whether or not the devices should be allowed to access the cellular interface of the individual's device and whether or not the individual's device should request data sharing from the selected devices.

For instance, the list 304 can display all devices that are within communication range of a local wireless communication interface, such as a near field communication (NFC) interface or a WiFi interface. These displayed devices can include devices of the selecting individual's friends and family and may also include devices of other unknown individuals. The selecting individual is able to indicate which, if any, of the selected devices should be allowed to participate in the sharing of available plan data.

The display 302 can also present options for selecting between different sharing profiles 310, 312 and 314. The sharing profiles can define when and how available plan data is shared as well as when and how requests for available plan data are sent. The sharing profiles can be include predetermined profiles, such as an aggressive sharing profile 310 that uses a more relaxed set of sharing standards and a conservative sharing profile 312 that uses a more stringent set of sharing standards. Sharing profiles can also include one or more custom profiles 314, which allow the individual to select and modify variety of different profile rules.

Consistent with certain embodiments, a data sharing threshold can be used to determine whether or not a data sharing request should be granted. If the amount of data already used exceeds the threshold, a data sharing request can be denied. Different devices can have different thresholds (e.g., devices assigned to an aggressive sharing policy 310 may have a higher threshold than devices assigned to a conservative sharing policy 312).

Various embodiments are directed toward intelligent profiles that account for a variety of factors. For instance, at the beginning of the plan period, the entire amount of plan data remains because no data has yet been transmitted or received. In the absence of specific sharing rules, much of the available plan data could be shared in the first few days, which could leave the individual with little or no remaining available plan data for remainder of the plan period. In certain implementations, this data sharing threshold can be adjusted according to the amount of time left in the data plan. For instance, the data sharing threshold can be adjusted upwards as the end of the plan period nears and the corresponding plan reset is closer in time.

Various embodiments are directed toward the use sharing polices that use predictive algorithms to assess the likelihood that there will be unused plan data at the end of the plan period. For instance, a predictive algorithm can be used to predict data usage patterns and adjust the data sharing threshold(s) accordingly. A particular predictive algorithm might account for an expected higher amount of data usage at particular times (e.g., on weekends or at different times of the month), based upon location information (e.g., whether the user is traveling) or other relevant information. In certain embodiments, the prediction can be based upon previous usage patterns for the device.

Figure 4:
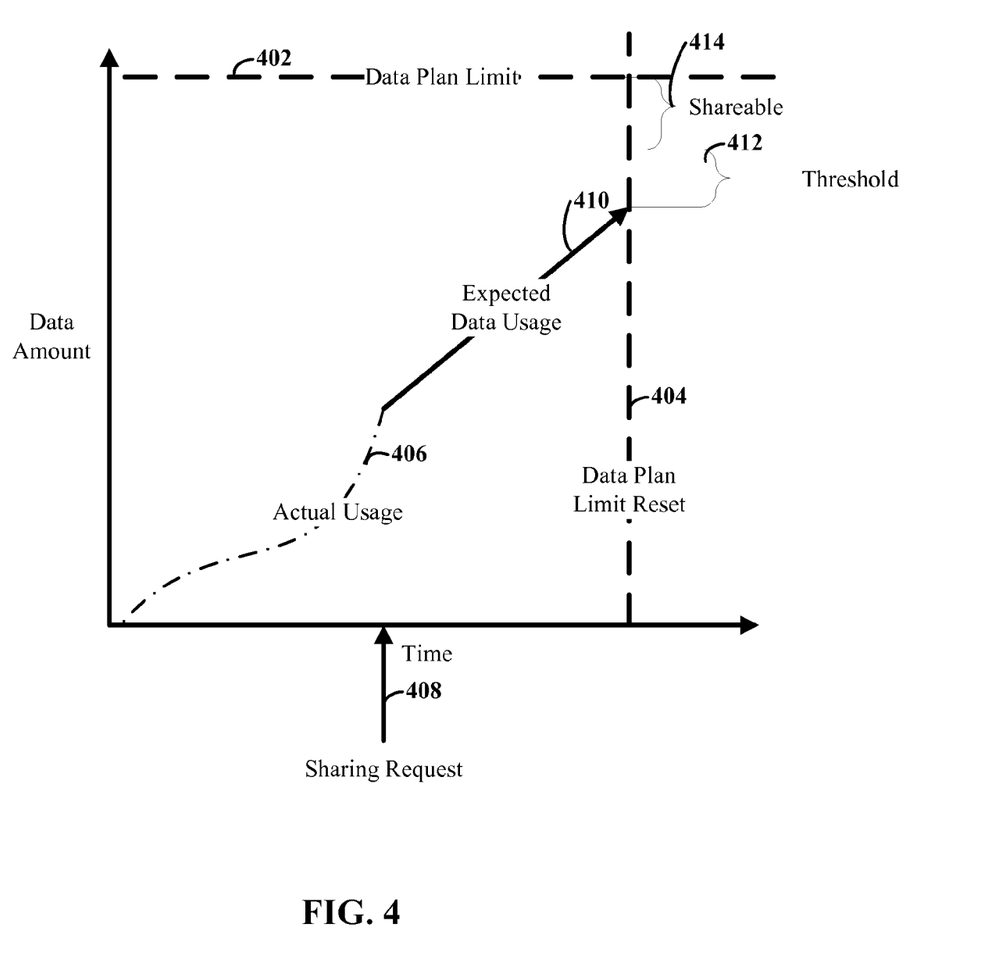
FIG. 4 depicts a graph of plan usage for a device receiving a sharing request, consistent with embodiments of the present disclosure.

FIG. 4 depicts a graph of plan usage for a device receiving a sharing request, consistent with embodiments of the present disclosure. The vertical axis of the graph represents a cumulative amount of data usage and the horizontal axis represents time. The dashed line 402 represents a data plan limit that a potential sharing device can be configured to avoid exceeding. The data plan limit 402 may be a point at which further data usage incurs additional costs or at which point data bandwidth is limited or cut off. Other consequences to exceeding the plan limit 402 are also possible depending upon the particular cellular provider and cellular plan agreement.

The dashed line 404 represents the point at which the cumulative amount of data usage resets relative to the data plan limit 402. In some cases this can occur at, or near, the end of the billing cycle. For instance, cellular data plans can have monthly data plan limits that allow a certain amount of data usage per monthly period without incurring additional cost. The cellular provider can track the cumulative amount of cellular data usage. At the end of each monthly period, the cumulative amount is reset and tracking begins for the next month.

The sharing request 408 is depicted as being received at a point in time part way through a usage tracking period (e.g., part way through a monthly period). The dashed line 406 represents the actual cumulative data usage for the device receiving the sharing request 408. The solid line 410 represents an expected or predicted data usage for the remaining portion of the tracking period. The predicted data usage 410 is shown as a linear prediction but the predicted data usage can also use nonlinear predictions (e.g., based upon previous usage patterns). As depicted, the expected data usage remains below the data plan limit 402 at the time of the data plan limit 402. Accordingly, there is a predicted excess of plan data that can potentially be shared.

Consistent with embodiments of the present disclosure, one or more sharing thresholds 412 (or policy-based margins) can be used to determine whether or not to grant sharing request 408. For instance, the grant of sharing request 408 can be contingent upon the predicted excess plan data being more than the sharing threshold 412. Sharing threshold 412 can also be set to extend beyond (above) the data plan limit 402 and thereby allow some amount of data sharing beyond the plan limit 402. As depicted, there is an excess portion 414 that can be shared. Accordingly, sharing request 408 can be granted.

Figure 5:
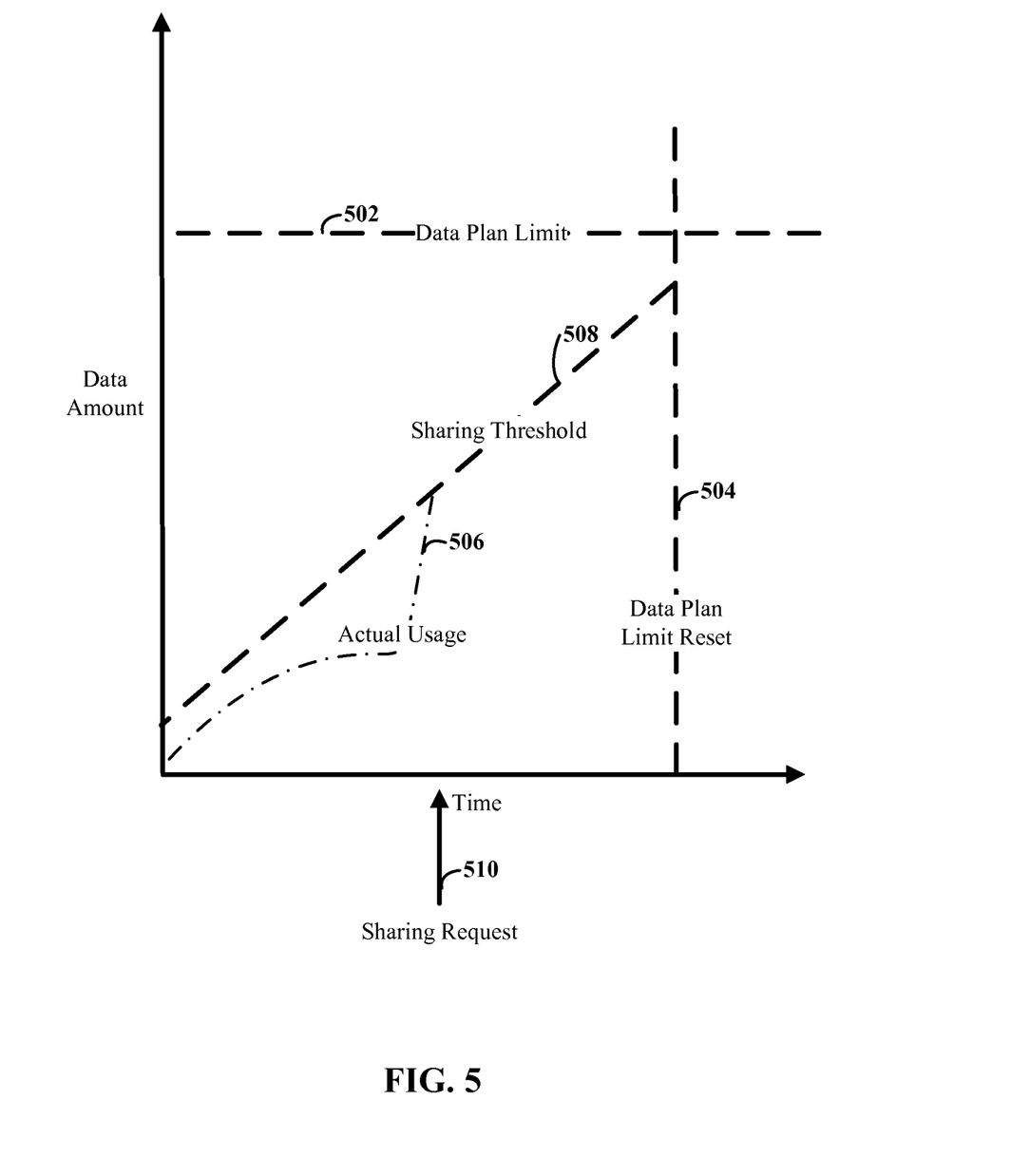
FIG. 5 depicts a graph of plan usage for a device generating a sharing request, consistent with embodiments of the present disclosure.

FIG. 5 depicts a graph of plan usage for a device generating a sharing request, consistent with embodiments of the present disclosure. The dashed line 502 represents a data plan limit that a potential sharing device can be configured to avoid exceeding, and dashed line 504 represents the point at which the cumulative amount of data usage resets relative to the data plan limit 502. The dashed line 506 represents the actual cumulative usage for the device. The dashed line 508 represents a sharing threshold. When the actually usage 506 exceeds the sharing threshold 508, the cellular device can generate one or more sharing requests 510. The sharing threshold 508 is shown as a linear line, however, the sharing threshold 508 can also increase non-linearly (e.g., based upon previous usage patterns).

Figure 6:
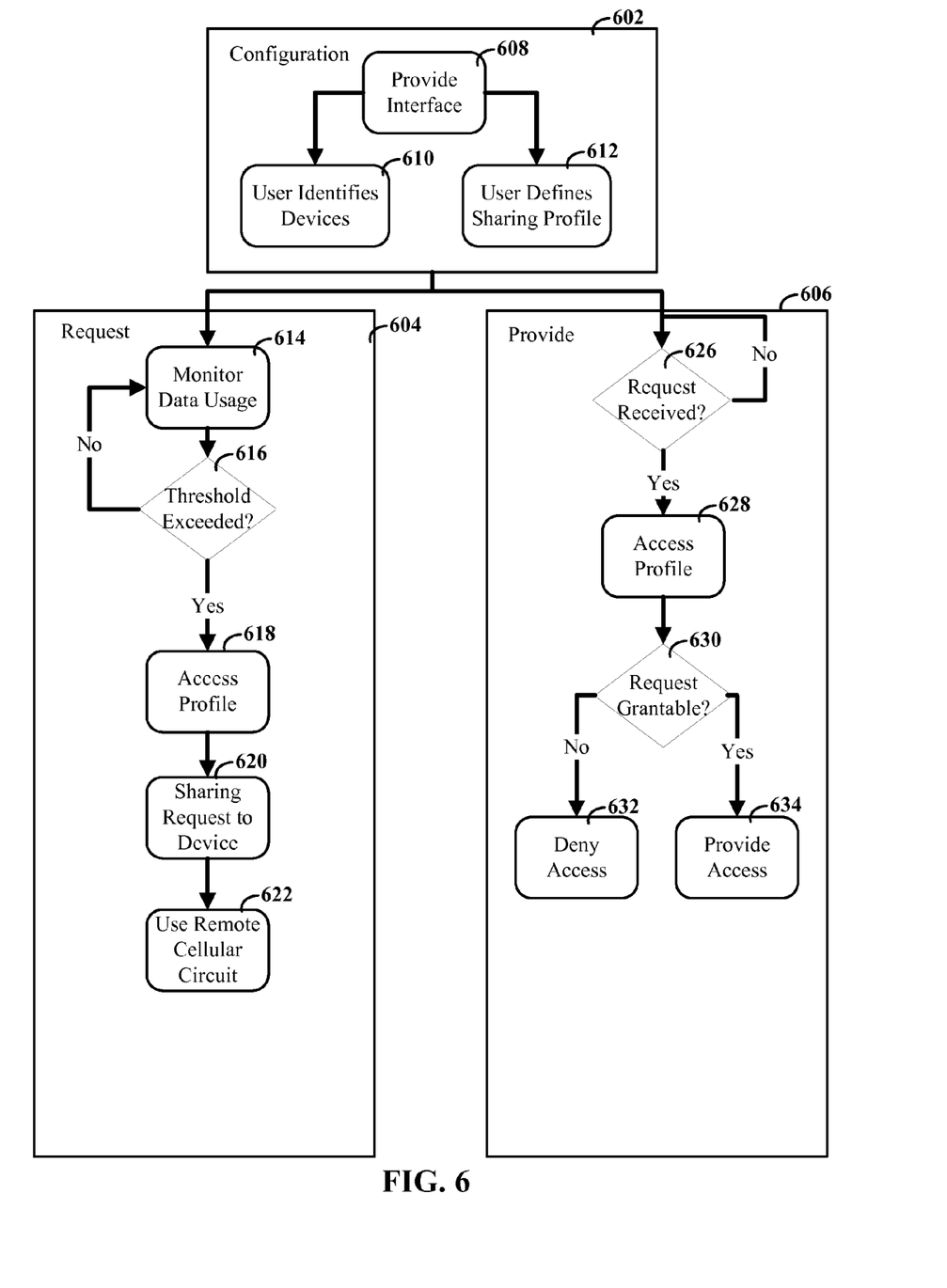
FIG. 6 depicts a flow diagram for sharing cellular plan data between cellular devices, consistent with embodiments of the present disclosure.

FIG. 6 depicts a flow diagram for sharing cellular plan data between cellular devices, consistent with embodiments of the present disclosure. The flow diagram is separated into three different sections, configuration section 602, request section 604 and provide (request grant) section 606. Configuration section 602 allows individuals to setup sharing parameters and policies. Request section 604 handles the generation of sharing requests, while the provide section 606 handles the processing of received sharing requests. Consistent with embodiments of the present disclosure, the functions of these sections can be carried out on cellular device, such as a smart phone or a tablet that is configured with one or more software applications.

As part of configuration or setup 602, the cellular device can be configured to provide a user interface, as shown by block 608. The cellular device can generate this user interface so that the device operator (or user) and can select or identify which other cellular devices can potentially share plan data, as shown by block 610. The user interface can also allow for an operator to select and define sharing profiles for identified cellular devices, as shown by block 612.

As part of generating a sharing request (per section 604), the cellular device can monitor cellular data usage as shown by block 614. This monitoring can be carried out using a software application that monitors data usage directly, accesses data usage reporting provided by another application or data source, or uses a combination thereof. For instance, a cellular service provider may provide up-to-date cellular data usage information to their customers and this information can be used instead of, or in conjunction with, directly monitoring data usage at the cellular device.

At block 616, the cellular device can determine whether or not the current data usage exceeds a sharing threshold. If not, the cellular device can continue to monitor data usage per block 614. If a data sharing threshold is exceeded, the cellular device can then access profile data from a (local) database, as shown by block 618.

According to embodiments of the present disclosure, the profile information can include a list of possible devices for sending data sharing requests. Other information can include, but is not necessarily limited to, information regarding how strict other devices are with their sharing policies and the speed/capabilities of the other devices. In certain embodiments, the cellular device can use this information to select a subset of available devices. The cellular device can then send sharing request(s) to one or more of the available devices, as shown by block 620. If the sharing request is accepted by another device, the requesting cellular device can then use the (remote) cellular interface circuit of the accepting device, as shown by block 622.

As part of the granting of a sharing request (per section 606), the cellular device can determine that a sharing request has been received, as shown in block 626. The cellular device can then access profile data from a (local) database, as shown by block 628. The profile information can include a list of devices that are approved for potential sharing of cellular plan data. It can also include information such as, but not necessarily limited to, threshold level(s) for the devices, past sharing history and rules relating to the type of data being requested (e.g., different rules for streaming video as opposed to email).

The cellular device can then determine whether or not the sharing request is to be granted, as depicted in block 630. This determination can be made based upon a number of factors, some of which are discussed herein. For instance, the cellular device can compare a current usage level to a threshold level and make the determination based upon the results of the comparison. The cellular device can then deny access, per block 632, or grant access, per block 634.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer (processor) readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer (such as a cellular phone or cellular capable tablet), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A system comprising:
    a sharing mobile device from a group of mobile devices, the sharing mobile device including:
        a first cellular communication circuit configured and arranged to communicate data over a cellular data network according to a first cellular data plan from a first cellular service provider;
        a memory circuit storing profiles for each member device in the group;
        a processing circuit configured and arranged to:
            receive a cellular data sharing request from a second mobile device in the group, the second mobile device including a second cellular communication circuit configured and arranged to communicate data according to a second cellular data plan from a second cellular service provider;
            access data sharing policy information in the profiles that corresponds to the second mobile device, the data sharing policy information including data sharing rules for sharing the data with the second mobile device;
            access cellular data usage information in the profiles that corresponds to the second mobile device;
            determine an expected data usage of the sharing mobile device for a usage tracking period based on prior cellular data usage history;
            determine an excess data amount for the usage tracking period based on the expected data usage of the sharing mobile device and a data plan limit for the usage tracking period;
            determine a data sharing response based on the data sharing request, further based on the excess data amount exceeding a sharing threshold defined by the data sharing rules;
            provide, based on the data sharing response, the second mobile device with access to the first cellular communication circuit.

2. The system of claim 1, the sharing mobile device further including a local interface circuit configured and arranged to receive the cellular data sharing request from the second mobile device over a data network other than the cellular data network.

3. The system of claim 2, wherein the local interface circuit is one of Wi-Fi, Bluetooth, and near field communications.

4. The system of claim 2, wherein the processing circuit is further configured and arranged to use the local interface circuit to detect a presence of one or more member devices in the group and to display the one or more member devices as part of a configuration interface.

5. The system of claim 1, wherein the processing circuit is configured and arranged to provide the access to the first cellular communication circuit independent from the second cellular service provider.

6. The system of claim 1, further comprising the second mobile device configured and arranged to
    monitor cellular usage by the second mobile device;
    compare the monitored cellular usage to a cellular usage threshold;
    access a list of cellular capable devices from the group of mobile devices, the list including the sharing mobile device; and
    transmit the cellular data sharing request to one or more of the cellular capable devices on the list.

7. The system of claim 1, wherein the processing circuit is configured and arranged to limit access to the first cellular communication circuit based on a type of data requested in connection with the cellular data sharing request.

8. The system of claim 7, wherein limiting access to the first cellular communication circuit includes at least one of limiting an amount of data bandwidth provided and limiting a resolution of a provided video.

9. A system comprising:
    a requesting mobile device and a second mobile device from a group of mobile devices, the requesting mobile device including:

a first cellular communication circuit configured and arranged to communicate data over a cellular data network according to a first cellular data plan from a first cellular service provider;

a memory circuit storing profiles for each member device in the group;

a processing circuit configured and arranged to:
   monitor an amount of data transmitted over the first cellular communication circuit;
   detect when the amount of transmitted data exceeds a threshold amount;
   access, in response to an application seeking first data available over the cellular data network according to the first cellular data play, the stored profiles;
   identify a plurality of potential sharing partners from the member devices based on the stored profiles;
   select the second mobile device from the plurality of potential sharing partners;
   transmit a data sharing request to the second mobile device; and
   access a second cellular communication circuit on the second mobile device for the first data;

the second mobile device including:
   the second cellular communication circuit configured and arranged to communicate data according to a second cellular data plan from a second cellular service provider;
   a memory circuit storing profiles for each member device in the group;
   a processing circuit configured and arranged to:
      allow the requesting mobile device to access the second cellular communication circuit based upon the second mobile device:
         determining an expected data usage for a usage tracking period based on prior cellular data usage history of the second mobile device;
         determining an excess data amount for the usage tracking period based on the expected data usage of the second mobile device and a data plan limit for the usage tracking period; and
         determining that the excess data amount exceeds a sharing threshold defined in the stored profiles.

10. The system of claim 9, wherein the processing circuit of the requesting mobile device is further configured and arranged to calculate the threshold amount as a function of the amount of time left in plan period for the first cellular data plan.

11. The system of claim 9, wherein the processing circuit of the requesting mobile device is further configured and arranged to calculate the threshold amount as a function of cellular data usage history.

12. The system of claim 1, wherein the first cellular service provider and the second cellular service provider are the same cellular service provider.

13. The system of claim 9, wherein the first cellular service provider and the second cellular service provider are the same cellular service provider.

14. The system of claim 9, the requesting mobile device further including a local interface circuit configured and arranged to transmit the data sharing request to the second mobile device over a data network other than the cellular data network.

15. The system of claim 14, wherein the local interface circuit is one of Wi-Fi, Bluetooth, and near field communications.

16. The system of claim 14, wherein the processing circuit of the requesting mobile device is further configured and arranged to use the local interface circuit to detect a presence of one or more member devices in the group and to display the one or more member devices as part of a configuration interface.

17. The system of claim 9, wherein the processing circuit of the requesting mobile device is configured and arranged to access the second cellular communication circuit independent from the first cellular service provider.

* * * * *